United States Patent [19]

Ikeda

[11] Patent Number: 4,642,681
[45] Date of Patent: Feb. 10, 1987

[54] COLOR IMAGE PROCESSING APPARATUS FOR GENERATING COLOR OUTPUT SIGNALS AND A BLACK OUTPUT SIGNAL IN A MUTUALLY EXCLUSIVE MANNER

[75] Inventor: Yoshinori Ikeda, Matsudo, Japan

[73] Assignee: Canon Kabushiki Kaisha, Tokyo, Japan

[21] Appl. No.: 538,916

[22] Filed: Oct. 4, 1983

[30] Foreign Application Priority Data

Oct. 8, 1982 [JP] Japan .............................. 57-178115
Oct. 9, 1982 [JP] Japan .............................. 57-178075
Mar. 7, 1983 [JP] Japan .............................. 58-36021

[51] Int. Cl.$^4$ .......................... G03F 3/08; H04N 1/46
[52] U.S. Cl. .................................. 358/79; 358/75
[58] Field of Search ................... 358/75, 79, 78, 80

[56] References Cited

U.S. PATENT DOCUMENTS

| | | | |
|---|---|---|---|
| 3,109,884 | 11/1963 | Zeyen | 358/79 |
| 3,209,070 | 9/1965 | Mawby | 358/79 |
| 3,560,757 | 2/1971 | Pugsley | 358/79 |
| 4,415,920 | 11/1983 | Kato et al. | 358/80 |
| 4,482,917 | 11/1984 | Gaulke et al. | 358/80 |

FOREIGN PATENT DOCUMENTS

| | | | |
|---|---|---|---|
| 52770 | 5/1981 | Japan | 358/79 |
| 152370 | 11/1981 | Japan | 358/75 |
| 44825 | 3/1982 | Japan | 358/75 |
| 79944 | 5/1982 | Japan | 358/75 |
| 182374 | 10/1983 | Japan | 358/79 |

Primary Examiner—James J. Groody
Assistant Examiner—Randall S. Svihla
Attorney, Agent, or Firm—Fitzpatrick, Cella, Harper & Scinto

[57] ABSTRACT

A color image processing apparatus includes a signal generator for generating color signals representative of at least three color components, each having a density level, for one pixel. A detector detects a specific color having a density level exceeding a predetermined density level by detecting the signals representative of the three color components and generates a specific signal representative of that specific color. A first processor is responsive to the color signals to conduct half-tone reproduction processing of the color signals to output color output signals. A second processor is responsive to the specific signal for outputting a signal of a predetermined level. Finally, a prohibiting device prohibits the output of the color output signals by the first processor when the second processor outputs the signal of the predetermined level. In a preferred embodiment, the specific color is black. The apparatus can reproduce an image including a half-tone portion and a character or line portion with excellent halftone reproduction characteristics and excellent sharpness of the character or line portion.

8 Claims, 14 Drawing Figures

COLOR IMAGE PROCESSING APPARATUS FOR GENERATING COLOR OUTPUT SIGNALS AND A BLACK OUTPUT SIGNAL IN A MUTUALLY EXCLUSIVE MANNER

BACKGROUND OF THE INVENTION

1. Field of the Invention

The present invention relates to an apparatus for separating data representing a pixel into a plurality of color component data and then performing color image processing in accordance with color component data thus obtained.

2. Description of the Prior Art

In a conventional apparatus for obtaining a color copy image in full color such as a color printer, a color copying machine or a color printing machine, a color image is obtained by superposing yellow, magenta and cyan developers or inks on the same image region. When such a color copy image is formed, the black component of the original image, and the reproduced black component of the copy image, largely determine the sharpness of the resultant image.

In a conventional color copying machine, for example, a black region is obtained by transferring thereto the respective yellow, magenta and cyan developers at a high density and with uniformity. However, the yellow, magenta and cyan developers do not purely consist of yellow, magenta and cyan components alone and have reflection factors which are a function of wavelength or spectral reflectances as shown in FIG. 1. For example, a magenta developer is known to contain considerable amounts of yellow and cyan components, and a cyan developer is known to contain small amounts of yellow and magenta components. Accordingly, even if yellow, magenta and cyan developers are uniformly transferred to the black region, the color balance between the three colors may not be complete and the resultant black region may have a slight hue. Furthermore, since developers of the three colors are superposed, the reflected light from the black region is not pure, resulting in an impure black appearance.

In view of this problem, in a printing machine, a method is adopted wherein a film for reducing undesirable yellow, magenta and cyan components corresponding to a black region is prepared and the respective color components of the black region are attenuated by superposition of the film. Then, the developers are printed on the black region to attain a true black appearance. However, this method can only be used in a big system such as a printing machine and requires advanced techniques. Therefore, this method is not generally adopted for this reason.

In a full color digital color printer wherein respective pixels of yellow, magenta and cyan can be controlled in units of dots, pixels of yellow, magenta and cyan are printed at high and uniform densities in a black region. However, in this case, non-uniform mixing or impurity of the colors can result.

In order to solve these problems, a method has been proposed wherein a black color material is used as the developer and a pixel wherein all of the yellow, magenta and cyan components have levels exceeding predermined threshold levels is determined to be a black pixel. However, since in a black pixel, yellow, magenta and cyan may also be printed in an attempt to reproduce the yellow, magenta and cyan levels, the yellow, magenta, cyan and black components may all be printed on the same pixel. This results in poor printing uniformity or impurity of the black color.

In a full color digital color printer, when a black component is printed by a black developer or ink, the reading system has a configuration as shown in FIG. 2. In this case, exposure light L is divided into respective color components $L_Y$, $L_M$, and $L_C$ by dichroic mirrors 5 to 7, which are subjected to photoelectric conversion by CCDs 8, 9 and 10. The electrical signals from the CCDs 8, 9 and 10 are amplified by amplifiers 11, 12 and 13 and are converted into color component digital signals through A/D converters 14, 15 and 16, respectively. The digital signals from the A/D converters 14, 15 and 16 are compared with predetermined digital values stored in dither ROMs 20, 21 and 22 by comparators 17, 18 and 19 which respectively produce final pixel data $D_Y$, $D_M$ and $D_C$. It is here assumed that pixel data of logic level "1" corresponds to the printing level. When all the pixel data $D_Y$, $D_M$ and $D_C$ are at logic level "1", the corresponding pixel is detemined to have pixel data $D_{BK}$ or be black component. Address generators 23 to 25 provide addresses for reading out the data in respective the dither ROMs 20, 21, and 22 in correspondence with the respective image positions on the image.

When threshold levels $T_Y$, $T_M$ and $T_C$, preset in the ROMs 20, 21 and 22 for a pixel containing Y, M and C components in the ratio shown in FIG. 3(a) are exceeded, this pixel is determined to be a black pixel. Since a black region has Y, M and C components of high densities, the overall image becomes dark unless the threshold levels $T_Y$, $T_M$ and $T_C$ are preset at considerably high levels. When only a black component is considered, the threshold levels $T_Y$, $T_M$ and $T_C$ are preferably high. However, if the threshold levels of the color components are preset to be considerably high, digital data representing a pixel having the respective color components as shown in FIG. 3(b) does not reach any of the threshold levels. Thus, in spite the fact that an original image may contain a considerable amount of halftone portions, the conversion outputs become "0", resulting in an image with unsatisfactory halftone portions. In view of this problem, the ROMs 20, 21 and 22 store dither patterns to allow reproduction of halftone portions. However, selection of the dither patterns and control thereof involve complex procedures and are difficult.

In a color printer for reproducing a halftone image using dot data of "1" and "0", a halftone image is usually reproduced by the dither method or the like. Since the dither method is well known, a description thereof will be omitted. In such a printer, when the original image is substantially a halftone image, a good reproduction characteristic may be expected. However, if the original image consists of both a halftone image portion and a character or line portion, such character or line will have poor sharpness. For example, if an original is a map in which black characters are printed on a halftone map image, the characters cannot be reproduced sharply. If the characters are to be reproduced sharply, the halftone image portion cannot be reproduced with high precision.

SUMMARY OF THE INVENTION

The present invention has been made in consideration of the above-noted problems in the prior art and has for its object to provide a color image processing apparatus which is capable of reproducing high-quality color images.

It is another object of the present invention to provide a color image processing apparatus which does not perform recording in other color components of an image portion which is to be reproduced in black.

It is still another object of the present invention to provide a color image processing apparatus which has a threshold level for a black component and separate threshold levels for other color components.

It is still another object of the present invention to provide a color image processing apparatus which is capable of varying the threshold level of the black component.

The above and other objects, features and advantages of the present invention will become apparent from the following description taken in conjunction with the accompanying drawings.

DETAILED DESCRIPTION OF THE PREFERRED EMBODIMENTS

The preferred embodiments of the present invention will now be described with reference to the accompanying drawings.

Figure 1:
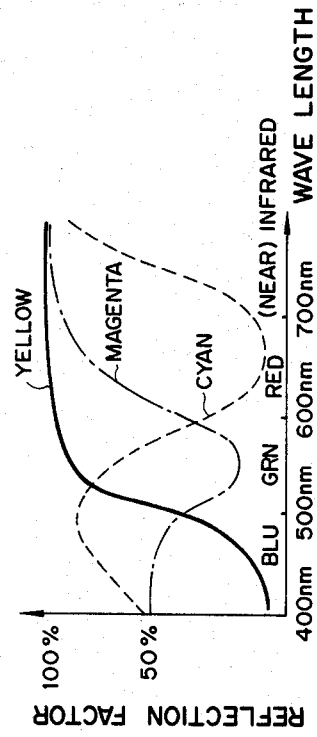
FIG. 1 is a graph showing the reflection factors as a function of wavelength (spectral reflectances) for respective developers.
Figure 2:
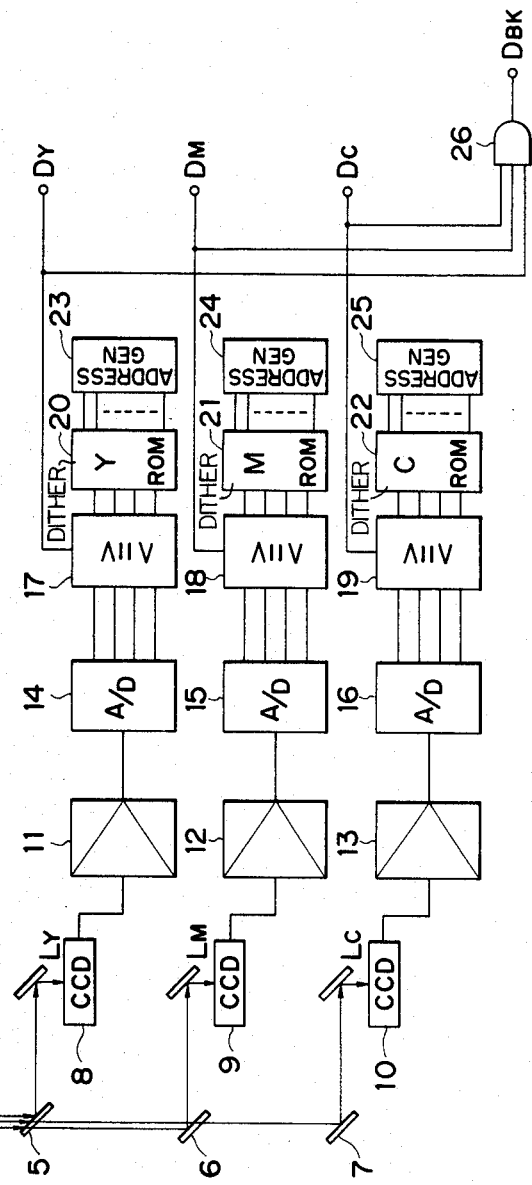
FIG. 2 is a block diagram of a signal processing circuit of a conventional color image reader.
Figures 3A, 3B:
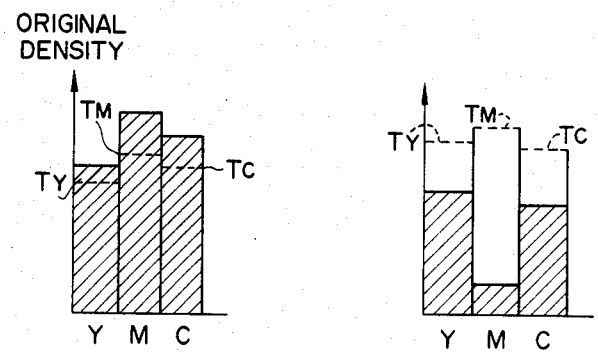
FIGS. 3A and 3B are views showing the relationship between the threshold levels of respective components and the color components of a pixel.
Figure 4:
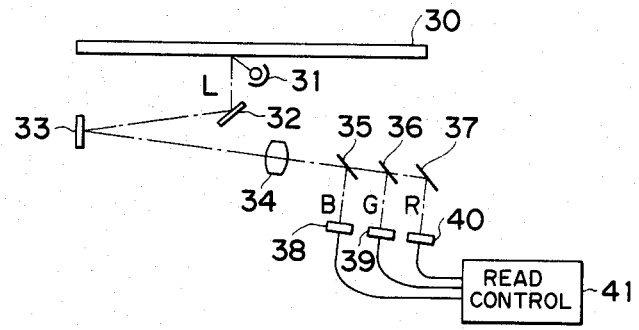
FIG. 4 schematically shows the configuration of an image reader according to the present invention.
Figure 5:
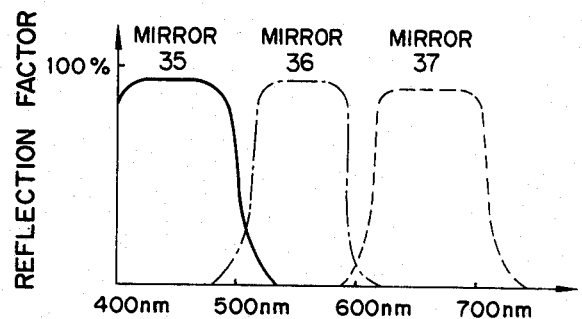
FIG. 5 is a graph showing the spectral reflectances of dichroic mirrors.
Figure 6:
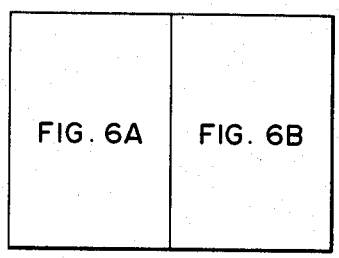
FIG. 6 shows how

FIG. 4 is a schematic view showing an image reader of a digital color copying machine according to the present invention. An original placed on an original table 30 is illuminated with light from an original illuminating lamp 31. Reflected light L from the original is reflected by mirrors 32 and 33, focused by a lens 34, and transmitted and reflected by dichroic mirrors 35 and 36. Reflected light received from the original and reflected by mirrors 32 and 33 is separated into B (blue), G (green) and R (red) components which are supplied to CCDs 38, 39 and 40. The CCDs 38, 39 and 40 produce electrical signals representing the quantities of respective light components. The dichroic mirrors 35 and 36 respectively have the spectral reflectance characteristics as shown in FIG. 5. A blue filter of a complementary color of yellow and a green filter of a complementary color of magenta are respectively coated on the dichroic mirrors 35 and 36. An infrared ray cutting filter is coated on the mirror 37 such that the mirror 37 reflects only the red light which is the complementary color of cyan. The electrical signals obtained in correspondence with the respective color components are supplied to a read control circuit 41 for signal processing.

Figure 7:
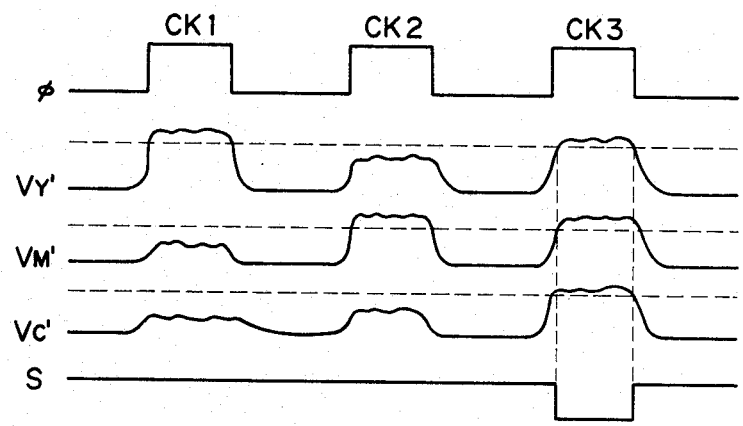
FIG. 7 shows the relationship between the respective color video signals and the black signal.
Figure 6A:
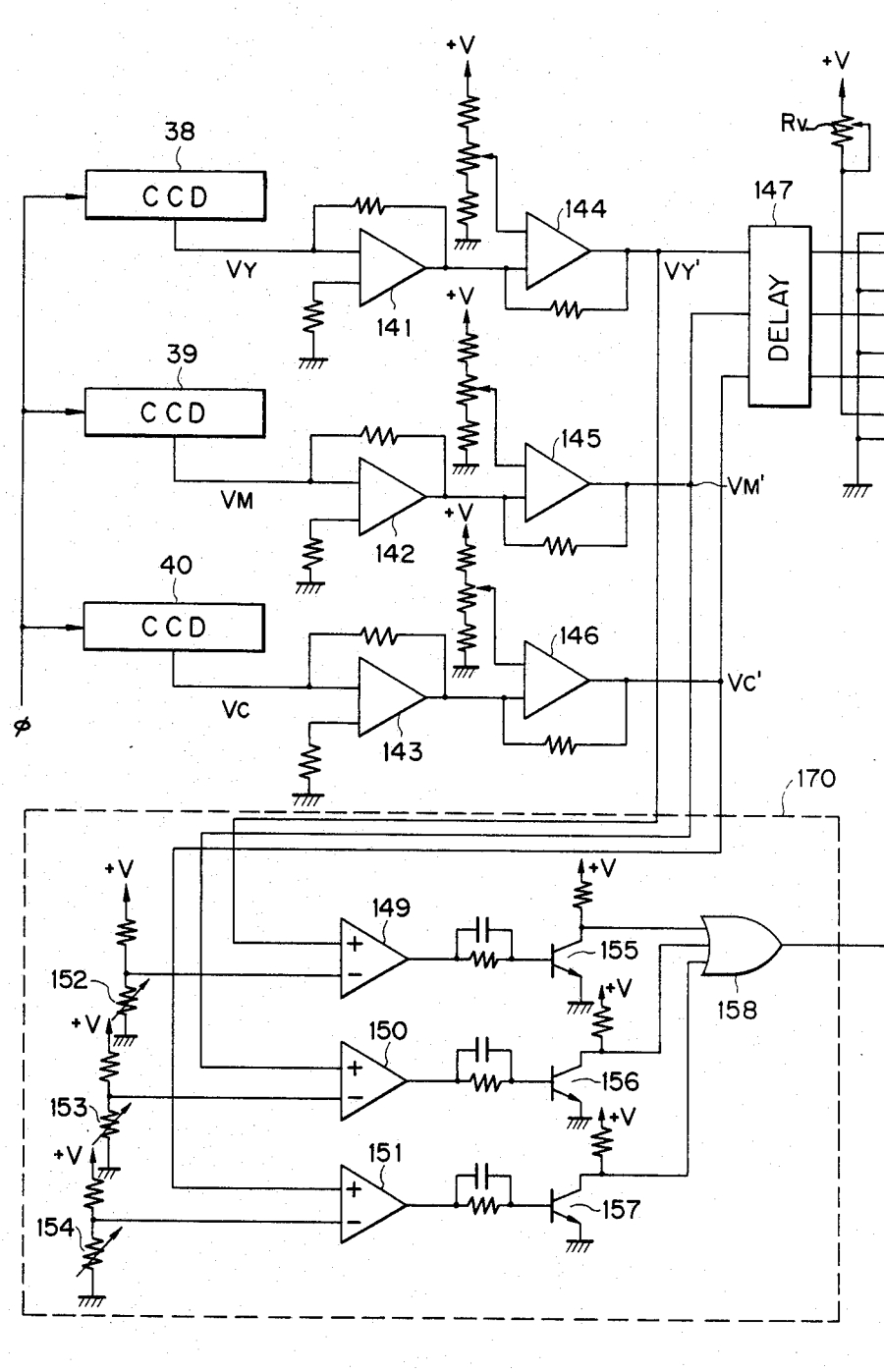
FIGS. 6A and 6B are assembled to form a block diagram of a signal processing circuit of the image reader according to the present invention.
Figure 6B:
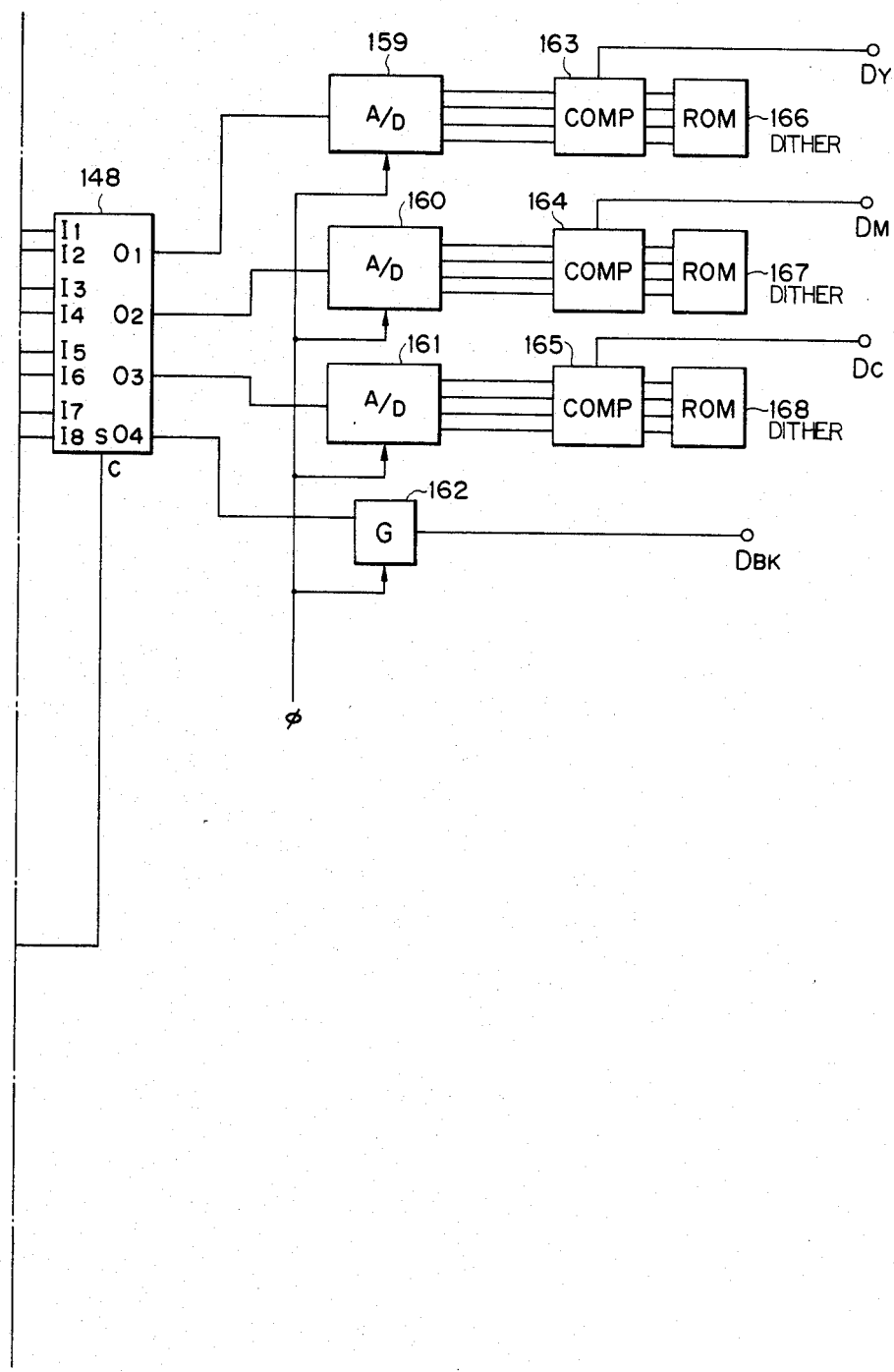

FIGS. 6A and 6B show a block diagram of the read control circuit of the present invention. The color component signals supplied to the read control circuit 41 are read by the CCDs 38, 39 and 40 which produce video signals $V_Y$, $V_M$, and $V_C$ in synchronism with a clock $\phi$ from an oscillator (not shown). The video signals $V_Y$, $V_M$ and $V_C$ are respectively amplified by amplifiers 141, 142 and 143 and level-adjusted by amplifiers 144, 145 and 146 which produce video signals $V_Y'$, $V_M'$ and $V_C'$. The video signals $V_Y'$, $V_M'$ and $V_C'$ are supplied to the subsequent circuit stages to become respective pixel signals of yellow, magenta and cyan and are also supplied to a black component extraction circuit 170. The video signals $V_Y'$, $V_M'$ and $V_C'$ are compared with threshold levels set by variable resistors 152, 153 and 154 by comparators 149, 150 and 151, respectively. When the input video signal has a level higher than the threshold level, the output from the corresponding one of the comparators 149, 150 and 151 goes to logic level "1". The threshold levels for comparison may be changed for each of the Y, M and C components. When all the video signals $V_Y'$, $V_M'$ and $V_C'$ exceed the corresponding threshold levels, the outputs from all the comparators 149, 150 and 151 go to logic level "1". Then, transistors 155, 156 and 157 are turned on, and inputs to an OR gate 158 become all "0". The output from the OR gate 158 is "0" and is supplied as a signal C to a switch input terminal S of an analog multiplexer 148. Accordingly, if at least one of the video signals $V_Y'$, $V_M'$ and $V_C'$ exceeds the corresponding threshold level, a signal C supplied to the terminal S is "1". Thus, when all the video signals are at high level, that is, when the Y, M and C components are all at high densities, data of the corresponding image portion is extracted as a black component and the signal C supplied to the terminal S is kept at logic level "0". This is shown in FIG. 7. The duration of a clock pulse CK3 of the clock $\phi$ wherein all the video signals $V_Y'$, $V_M'$ and $V_C'$ exceed the corresponding threshold levels corresponds to a black (BK) component. As noted, in this case, the signal C is at logic level "0".

As described above, the video signals $V_Y'$, $V_M'$ and $V_C'$ are used for extracting the BK component and are also color signals of yellow, magenta and cyan. Thus, the video signals $V_Y'$, $V_M'$ and $V_C'$ are supplied to input ports $I_2$, $I_4$, and $I_6$ of the multiplexer 148. The input ports $I_2$, $I_4$, $I_6$ and $I_8$ and output ports $O_1$, $O_2$, $O_3$ and $O_4$ of the multiplexer 148 are connected by the signal C supplied to the terminal S, which is at logic level "1" corresponding to a component other than the BK component. The input ports $I_1$, $I_3$, $I_5$, and $I_7$ and the output ports $O_1$, $O_2$, $O_3$, and $O_4$ are connected by the signal C which is at a logic level "0" corresponding to the BK component. Thus, the color signals of yellow, magenta and cyan are connected and disconnected by switching the connection between the input and output ports of the multiplexer 148. A delay circuit 147 delays the video signals for synchronization with the black component from the black component extraction circuit 170. When the signal C is at logic level "1", that is, it indicates a component other than a black component, the video signals $V_Y'$, $V_M'$ and $V_C'$ and the signal of "0" for the BK component are connected to the output ports $O_1$, $O_2$, $O_3$ and $O_4$. The yellow, magenta and cyan component signals are A/D converted by A/D converters 159, 160 and 161. The obtained digital signals are compared with the threshold levels stored as a dither matrix in ROMs 166, 167 and 168 by comparators 163, 164 and 165, respectively. The signals are thus binary-coded to pixel data $D_Y$, $D_M$, and $D_C$ which are supplied to printer (not shown) or a memory such as a disc file. The BK component is gated by a gate 162 and is supplied as pixel data, when equal to "0", as representing the BK component. When the signal C is at logic level "0", that is when the black component is obtained, the input ports $I_1$, $I_3$, $I_5$ and $I_7$ of the multiplexer 148 are connected to the output ports $O_1$, $O_2$, $O_3$ and $O_4$ thereof. The video signals of logic level "0" are supplied to the outputs $O_1$, $O_2$, and $O_3$ from ground potential, and a BK component of logic level "1" generated by the voltage source $+V$ through variable resistor $R_V$ is supplied from the input port $I_7$ to the output port $O_4$. Since the outputs appearing at the output ports $O_1$, $O_2$ and $O_3$ are "0", the data $D_Y$, $D_M$ and $D_C$ of logic level "0" are obtained through the A/D converters 159, 160 and 161 and the comparators 163, 164 and 165. The black data $D_{BK}$ of logic level "1" is supplied to the subsequent circuit stage from the multiplexer 148 after being gated at proper timing through the gate 162. By such processing, the data for yellow, magenta and cyan become zero at the black portion of the original, and become data of corresponding densities at the original portion other than the black portion and the black data becomes zero at this portion. Thus, proper color data is selected and controlled such that black pixels and other color pixels may not be superposed.

In this embodiment, a method is adopted wherein prior to A/D conversion of the analog signals from the CCDs, the respective color component signals are sampled to obtain a black component and the respective color components are switched by means of the multiplexer. However, it is easily seen that similar effects can be obtained if the digital signals after A/D conversion are sampled to obtain a black component or the digital signals are switched by another type of switching means.

In the embodiment described above, signal processing as described above is performed for the color component signals obtained from the CCDs. However, similar signal processing may be performed for the image data of each color which is obtained from another type of scanner or is stored in a memory.

As an alternative, a circuit for obtaining a BK component from the image data of the respective colors and for discriminating whether the data of yellow, magenta and cyan of a single pixel are effective based on the obtained BK component may also be used as a circuit for prohibiting transmission of the signals as described above.

An example will now be described wherein the signals from the CCDs are A/D converted and then the black component is extracted.

Figure 8:
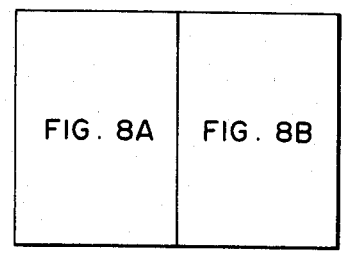
FIG. 8 shows how

FIG. 8 is a block diagram of a color image recording apparatus according to another embodiment of the present invention. Reflected light L from an original is separated into B and G components by dichroic mirrors 211 and 212 and is used for extraction of an R component by mirror 213 on which an infrared ray cutting filter is coated. The respective color components are subjected to photoelectric conversion by CCDs 217, 218, and 219. The electrical signals from the CCDs 217, 218, and 219 are amplified by amplifiers 220, 221, and 222 and are A/D converted by A/D converters 223, 224, and 225 at the timing of a clock $\phi$ from a clock generator 226. The digital signals from the A/D converters 223, 224, and 225 are compared with data stored in dither ROMs 226, 227, and 228 storing the threshold levels in the form of a dither matrix by means of a first group of comparators 229, 230, and 231. Thus, the binary data of the respective colors are obtained. Address generators 232, 233, and 234 generate addresses for reading out the data in the respective dither ROMs 226, 227, and 228. The address generators 232, 233, and 234 decide addresses of the dither ROMs 226, 227, and 228 on the basis of a vertical synchronizing signal $V_{sync}$, a horizontal synchronizing signal $H_{sync}$, and a clock signal $\phi$. The vertical synchronizing signal $V_{sync}$ initializes the address generators 232, 233, and 234. The horizontal synchronizing signal $H_{sync}$ provides an increment to an address in a vertical direction in the ROMs 226, 227, and 228. The clock signal $\phi$ provides an increment to an address in a horizontal direction. The binary pixel data from the comparators 229, 238, and 231 are stored in the corresponding color memories in a memory circuit 235 in synchronism with the clock $\phi$. An address generator 236 generates addresses for storing pixel data of yellow, magenta and cyan. The address generator 236 decides an address of the memory circuit 235 on the basis of the vertical synchronizing $V_{sync}$, the horizontal synchronizing signal $H_{sync}$, and the clock signal $\phi$. The vertical synchronizing signal initializes the address generator 236. The horizontal synchronizing signal determines an address location in the vertical direction in the memory circuit 235. The clock signal $\phi$ determines an address location in the horizontal direction in the memory circuit 235. A control circuit 237 controls the storage and readout of the respective pixel data into and from the memory circuit 235.

Meanwhile, the digital signals from the A/D converters 223, 224, and 225 are compared with threshold levels set by digital switches 241, 242, and 243 by a second group of comparators 238, 239, and 240. When all the outputs 54, 55 and 56 from the comparators 238, 239, and 240 are set at logic level "1", the corresponding pixel is discriminated as a black (BK) pixel by an AND gate 244. Then, the BK component is stored in a BK memory (not shown) in the memory circuit 235 as in the case of the other binary pixel data of yellow, magenta and cyan. The threshold level for the BK component can be varied for each of the color components (Y, M and C) by the digital switches 241 to 243. The pixel data stored in the memories of the memory circuit 235 are sequentially read out in the order of yellow, magenta, cyan and black and are used to modulate a beam from semiconductor laser 246 by a modulator 245 under control of laser driver 247. A precharged photosensitive body (not shown) is exposed to this modulated beam in accordance with the image data and is developed with Y, M, C and BK developers. The image is then transferred onto a transfer sheet. While the pixel data for yellow, magenta and cyan is read out on line 248, the image data for the BK component is read out onto a line 249.

Figure 9:
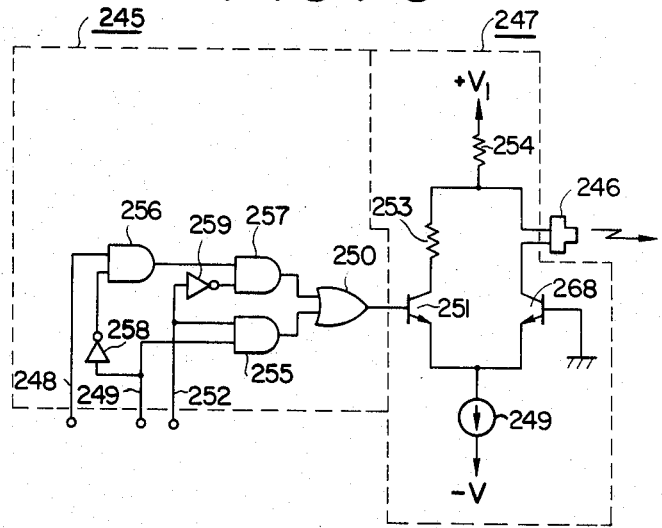
FIG. 9 is a circuit diagram of an output control circuit.
Figure 8A:
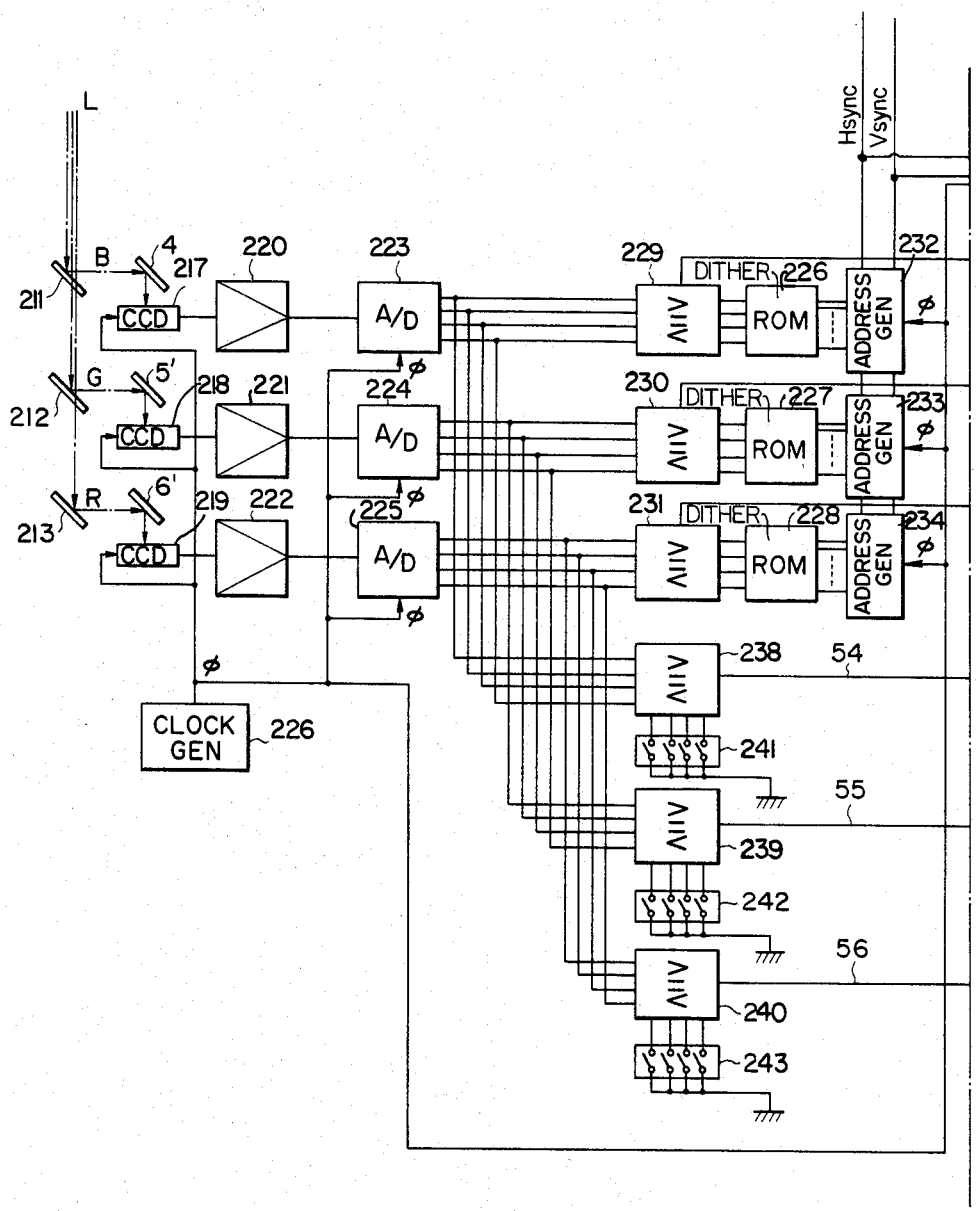
FIGS. 8A and 8B are assembled to form a block diagram showing the overall configuration of an image reader according to the present invention.
Figure 8B:
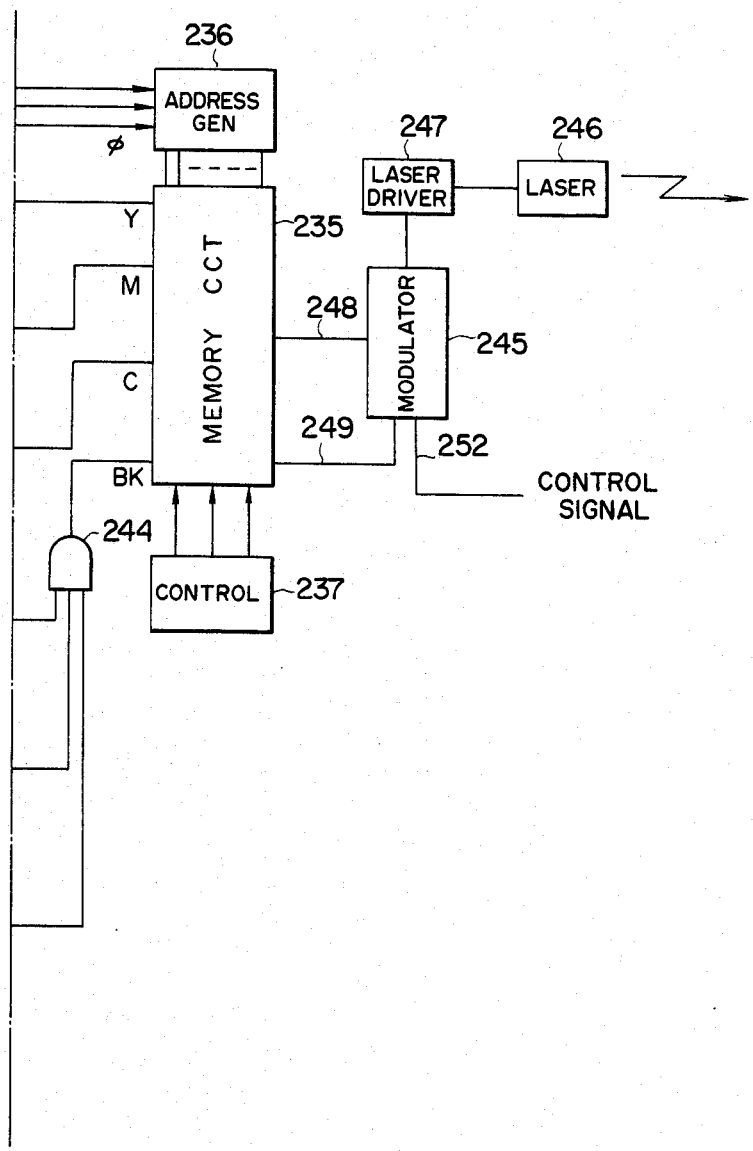

FIG. 9 shows the details of the modulator 245 and the laser driver 247. The current flows to the semiconductor laser 246 when a transistor 268 of the laser driver 247 is turned on. Then, the semiconductor laser 246 emits a laser beam. The current to be supplied to the semiconductor laser 246 is about 40 to 50 mA and is stabilized by a constant current circuit 249. When the output from an OR gate 250 is at logic level "1", a transistor 251 is turned on, the transistor 268 is turned off, through a circuit comprising voltage source $+V_1$ and resistors 253 and 254, and the laser beam is not emitted from the semiconductor laser 246. When the output from the OR gate 250 is "0", the transistor 251 is turned off, the transistor 268 is turned on and the laser beam is emitted. A control signal 252 (also shown in FIG. 8B) from a control section (not shown) is set at logic level "1" when the BK data is produced and is set at logic level "0" when the other data Y, M and C is produced.

When the control signal 252 is set at logic level "0", that is, when the data of Y, M or C is produced, output of the BK data from the line 249 is prevented by means of an AND gate 255; and the data of Y, M and C is produced from AND gates 256 and 257 respectively connected to the signals 249 and 252 through inverters 258 and 259. However, when the BK data is at logic level "1", that is when the image portion is a BK pixel portion, the signal on line 249 is inverted by the inverter 258 and the inverted signal is supplied to the AND gate 256. Therefore, the respective data of Y, M and C are not produced. Thus, the output of the Y, M and C data is controlled in accordance with the BK data. When the BK data is to be printed, the control signal 252 is kept at logic level "1", the outputs of the Y, M and C data from the AND gate 257 are prohibited, and the BK data from the AND gate 255 alone is produced.

In this embodiment, outputs of yellow, magenta and cyan are controlled using a pixel in which the respective components of yellow, magenta and cyan are included and exceed the threshold levels, i.e., pixel data with a high black density. However, it is also possible to suppress the output of pixel data other than black pixel data which is obtained by subtracting (performing background elimination) from the densities of the Y, M and C components the Bk component having the density equivalent to the lowest density among the color components Y, M and C. For example, when the Y component has a density of 5, the M component has a density of 6 and C component has a density of 7, the background elimination of BK=5, Y=0, M=1 and C=2 can be performed so that the yellow data output is suppressed when black data is produced.

The above embodiment is described with reference to a device comprising a combination of a laser and a photosensitive body as a recording means. However, the present invention is not limited to this.

For example, the present invention can be similarly applied to an ink jet printer, a thermal printer or the like.

In the embodiment described above, reproduction of other color components is prevented when the black density exceeds a predetermined level. However, the present invention is not limited to this. Similar control may be performed when one color component exceeds a predetermined level.

In summary, according to the present invention, a black component and other color components are not printed in superposition so that irregular printing or color impurity in the resultant image may be prevented.

The amount of each color component constituting the black component can be varied. Accordingly, a sharp image can be reproduced.

Since a black image portion having a density level exceeding a predetermined level is extracted from the data of the respective color images and halftone image signal processing is not performed for this portion since black printing with black developer is performed for such pixels, black characters and lines can be reproduced with excellent sharpness with a simple circuit configuration.

What I claim is:

1. A color image processing apparatus, comprising:
   signal generating means for generating color signals representative of three color components, each having a density level, for one pixel;
   detecting means for detecting a specific color having a density level exceeding a predetermined density level by detecting said signals representative of said three color components and for generating a specific signal representative of said specific color;
   first processing means, responsive to said color signals, for conducting half-tone reproduction processing of said color signals to output color output signals;
   second processing means, responsive to said specific signal, for outputting a signal of a predetermined level; and
   prohibiting means for prohibiting the output of said color output signals by said first processing means when said second processing means outputs said signal of the predetermined level.

2. An apparatus according to claim 1, wherein said first processing means includes dither processing means which outputs binary color output signals on the basis of a plurality of threshold levels and levels of said color signals.

3. An apparatus according to claim 1, further comprising:
   recording means for recording a color image on a recording medium on the basis of said color output signals output by said first processing means and said signal of the predetermined level output by said second processing means.

4. An apparatus according to claim 1, wherein said specific color is black and said specific signal generated by said detecting means is representative of the black color.

5. An apparatus according to claims 1 or 4, wherein said color signals generated by said signal generating means are representative of yellow (Y), magenta (M) and cyan (C) color components.

6. A color image processing apparatus, comprising:
   signal generating means for generating color signals representative of first, second, and third color components, each having a density level, for one pixel; and
   black signal generating means for generating a black signal upon detection of the condition that the color signal representative of said first color component has a higher density level than a first level, that the color signal representative of said second color component has a higher density level than a second level, and that the color signal representative of the third color component has a higher density level than a third level, said first, second and third levels being different from one another.

7. An apparatus according to claim 6, further comprising changing means for changing said first, second and third levels, respectively.

8. An apparatus according to claim 6, wherein said color signals generated by said signal generating means are representative of Y (yellow), M (magenta) and C (cyan) color components.

* * * * *